Feb. 7, 1939.  C. MAGID  2,146,638

WINDOW FOR MOTOR AND OTHER VEHICLE DOORS.

Filed April 2, 1937

Inventor —
Charles Magid
by his Attorneys

Patented Feb. 7, 1939

2,146,638

UNITED STATES PATENT OFFICE 2,146,638

WINDOW FOR MOTOR AND OTHER VEHICLE DOORS

Charles Magid, Johannesburg, Union of South Africa

Application April 2, 1937, Serial No. 134,664
In the Union of South Africa January 28, 1937

4 Claims. (Cl. 268—126)

This invention relates to windows for motor or other vehicle doors, and has particular reference to means for opening and closing such windows, e. g. so as to render the vehicle, when unoccupied, burglar proof.

According to the present invention, opening and closing means for the windows of vehicle doors comprise, in combination, a self-acting or power device whereby the window is movable upwards or closed, a crank or other hand-operated device whereby the window is retractable downwards or opened, and a release catch or other control element operable by shutting and/or opening of the door so as to cause said self-acting or power device to close said window automatically.

More specifically, the invention comprises means for opening and closing vehicle doors in which the window is adapted to be opened, and held open, against the action of spring or resilient means, and in which, when the door is shut and/or opened, the window is released so as to be closed automatically by the action of said means.

Preferably, the window, when closed, is retained in position positively.

One embodiment of the invention, as applied to the window of an automobile door, will now be described, by way of example, with reference to the annexed drawing, in which.

Figure 1:
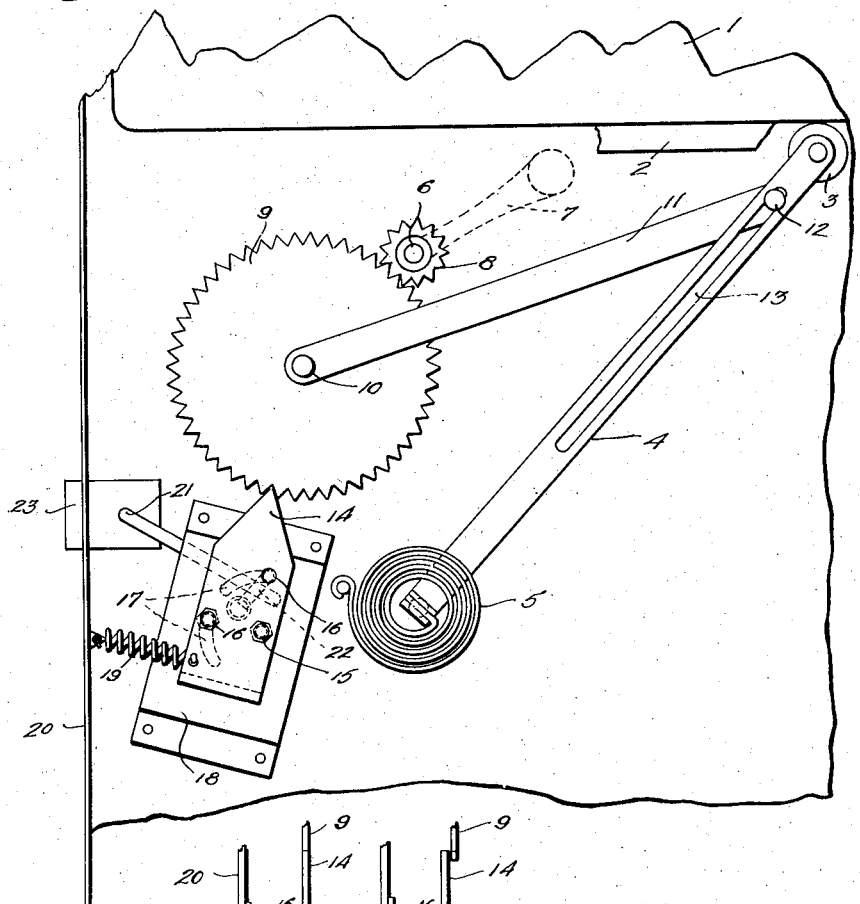
Fig. 1 is a front elevation of the opening and closing means, according to the invention, with the upholstery of the door removed.

Referring to the drawing:

The window 1 is fitted on its under-edge with a channel member 2, in the groove of which engages a roller 3 carried by a lever 4. A torque spring 5 exercises a constant clockwise turning moment on the lever 4, so as always to constrain the window 1 to its top or closed position. A shaft 6, fitted with an ordinary crank-handle 7, has fixed thereon a pinion 8, which engages with a toothed wheel 9.

As will be seen, the wheel 9 is fixed on a shaft 10, to which also is secured a lever 11. At its outer end, the latter is provided with a pin 12 which engages with a slot 13 formed longitudinally in the lever 4.

Figures 2, 3:
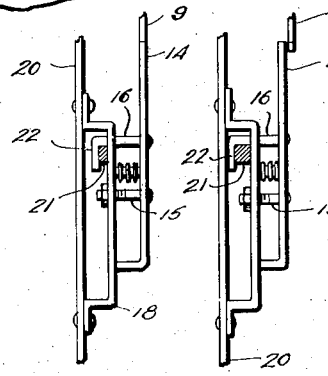
Figs. 2 and 3 are fragmentary views, in side elevation, of the release catch mechanism, in engaged, and free, position respectively.

A pawl 14 also engages with the toothed wheel 9, and is of spring metal so as to be depressible out of engagement therewith (see Fig. 3). Oscillating movement of the pawl 4 is adapted to take place about a pivot 15 to an extent determined by pins 16 engaging with arcuate slots 17 in a bracket 18. As shown in Fig. 1, a spring 19 connected to the door 20 and pawl 14 holds the latter in its normal position, i. e., radial to the wheel 9.

For the purpose of depressing the pawl 14, a wedge member 21 extends between the bracket 18 and a right-angled extension 22 on the upper or foremost pin 16 (Figs. 2 and 3). The member 21 is connected at its outer end to the ordinary locking bolt 23 of the door 20, so as to be thrust forwards and drawn backwards in unison therewith. A spring 24 is located between the pawl 14 and bracket 18, so as to assist in restoring the former to its upper or engaged position.

The modus operandi of the means described is as follows:

In order to lower or open the window 1, the handle 7 is rotated, as usual, in an anti-clockwise direction, whereby the levers 11 and 4 are turned downwards, thus permitting the window to descend under its own weight. In course of this operation, the pawl 14 oscillates about its pivot 15 as each tooth on the wheel 9 moves past the same. As will be understood, reverse movement of the wheel 9 is checked in any position by the pawl 14, which thus serves to hold the window 1 in whatever position to which it is lowered.

The door 20 of the automobile being closed, the locking bolt 23 will be in its extended position, i. e., in engagement with the ordinary catch on the door frame (not shown). Whenever the bolt 23 is retracted (i. e., when the occupant, about to leave the vehicle, turns the usual door handle) the wedge-member 21 will be thrust forward between the bracket 18 and extension 22 from the position shown in Fig. 2 to that shown in Fig. 3. As a result, the pawl 14 is depressed out of engagement with the toothed wheel 9, whereupon the levers 11 and 4 are free to move upwards under the action of the torque spring 5.

The time during which the locking bolt 23 customarily remains retracted (i. e., the duration of the occupant's grip on the door handle when turned back) is sufficient to permit the window 1 to spring upwards completely to its closed position. Thereafter, when the door handle is released and the bolt 23 moves outwards, the pawl 14 resumes its raised position in engagement with the toothed wheel 9. Thus, the window is held closed positively.

As will be apparent, when the door is again closed, the momentary backward spring of the bolt 23 as it snaps into the catch on the frame does not interfere with the position of the window. The pawl 14 merely springs downwards and then upwards again into engagement with the wheel 9, the window meanwhile being under the constant upward thrust of the spring 5.

If, in any instance, the window 1 is turned downwards by the handle 7 while standing open, it can be closed automatically by simply turning the door handle (not shown) and thereby freeing the wheel 9 from the restraint of the pawl 14 for a sufficient time.

Various modifications may be made in the means described without departing from the scope of the invention. For example, the pawl 14 or similar release device may be operable upon closing, instead of opening, of the door 20, as, e. g., by actuating it by a wedge-member controlled by a depressible plunger adapted to contact with a stop on the door frame.

In any case, the power utilized to raise the window may be compressed air or other pressure fluid, or electricity. For example, the door handle may simultaneously control a valve or switch putting the power means into or out of operation.

I claim:

1. In combination with an automobile body having a door provided with a window therein and a free edge through which movably projects the usual latch bolt arranged to engage a socket in an adjacent fixed portion of said body, a member engaging the window in said door, mechanism for actuating said member to permit opening of said window, and means controlled by an element actuated by said latch bolt upon retraction thereof automatically operative to actuate the member and close said window independently of said window opening mechanism.

2. In combination with an automobile body having a door provided with a window therein and a free edge through which movably projects the usual latch bolt arranged to engage a socket in an adjacent fixed portion of said body, a member engaging the window in said door, mechanism for actuating said member to permit opening of said window, means automatically operable to actuate the member and close said window independently of the window opening mechanism, and a control element actuated by said latch bolt upon retraction thereof for causing operation of the last mentioned means to close the window.

3. In combination with an automobile body having a door provided with a window therein and a free edge through which movably projects the usual latch bolt arranged to engage a socket in the adjacent portion of said body, a lever engaging said window, a torque spring tending to actuate said lever in one direction to close the window, a crank operated mechanism including a gear for actuating the lever in the opposite direction against said torque spring to permit said window to open, a pawl normally engaging the teeth of said gear for retaining said crank operated mechanism in the position to which actuated in opening the window, and a member actuated by the latch bolt upon retraction thereof operable to disengage said pawl from the gear and permit the torque spring to actuate said lever and close said window independently of the crank operated mechanism.

4. In combination with an automobile body having a door provided with a window therein and a free edge through which movably projects the usual latch bolt arranged to engage a socket in the adjacent portion of said body, a pivoted lever engaging said window, a torque spring tending to actuate said lever in one direction to close the window, a rotatable gear, a link secured to said gear for rotation therewith and having a slidable connection with the lever, a crank device for rotating said gear and link to actuate said lever in the opposite direction against said torque spring to permit said window to open, a pawl normally engaging the teeth of said gear for retaining the same and said crank device in the position to which actuated in opening the window, and a member actuated by the latch bolt upon retraction thereof operable to disengage said pawl from the gear and permit the torque spring to actuate said lever and close said window independently of the crank device and the gear and link actuated thereby.

CHARLES MAGID.